United States Patent
Macedo et al.

(10) Patent No.: US 6,334,337 B1
(45) Date of Patent: Jan. 1, 2002

(54) AIR BUBBLER TO INCREASE GLASS PRODUCTION RATE

(75) Inventors: Pedro Buarque de Macedo, 6100 Highboro Dr., Bethesda, MD (US) 20817; Robert K. Mohr, Washington, DC (US); Hamid Hojaji, Bethesda, MD (US); Ian L. Pegg, Alexandria, VA (US); Marek Brandys, Bethesda, MD (US)

(73) Assignees: Pedro Buarque de Macedo, Bethesda; Theodore Aaron Litovitz, Anapolis, both of MD (US)

( * ) Notice: Subject to any disclaimer, the term of this patent is extended or adjusted under 35 U.S.C. 154(b) by 0 days.

(21) Appl. No.: 09/375,805

(22) Filed: Aug. 17, 1999

(51) Int. Cl.⁷ .................................................. C03B 5/16
(52) U.S. Cl. ...................... 65/134.5; 65/134.8; 65/134.4; 65/135.2; 65/135.7; 65/178; 65/374.12; 65/374.13; 65/493; 588/11; 588/900; 588/252; 373/29; 373/37; 373/116; 422/231
(58) Field of Search ................................ 65/134.4, 134.5, 65/134.8, 135.2, 135.7, 178, 374.12, 374.13, 493; 588/11, 900, 252; 373/29, 37, 116; 422/231; 266/216, 251

(56) References Cited

U.S. PATENT DOCUMENTS

| | | | |
|---|---|---|---|
| 2,593,197 A | | 4/1952 | Rough |
| 2,640,503 A | * | 6/1953 | Milligan et al. |
| 3,030,736 A | | 4/1962 | Penberthy |
| 3,239,324 A | | 3/1966 | Monks, Jr. |
| 3,367,761 A | * | 2/1968 | Zitkus |
| 3,397,973 A | * | 8/1968 | Rough ............................. 65/356 |
| 3,573,019 A | | 3/1971 | Rees |
| 3,811,858 A | | 5/1974 | Ernsberger et al. |
| 3,971,646 A | | 7/1976 | Rhodes |
| 4,082,527 A | * | 4/1978 | Jones et al. |
| 4,427,428 A | * | 1/1984 | Bhatti et al. |
| 4,708,848 A | * | 11/1987 | Lewis ......................... 65/374.12 |
| 5,075,076 A | * | 12/1991 | Guerlet et al. |
| 5,188,649 A | | 2/1993 | Macedo et al. |
| 5,340,372 A | | 8/1994 | Macedo et al. |
| 5,417,735 A | * | 5/1995 | McGarry |
| 5,643,350 A | | 7/1997 | Mason et al. |
| 5,683,484 A | | 11/1997 | Pieper et al. |
| 5,728,190 A | | 3/1998 | Pieper et al. |
| 5,868,814 A | | 2/1999 | Lin |

FOREIGN PATENT DOCUMENTS

| | | | | |
|---|---|---|---|---|
| GB | 794292 | * | 4/1958 | ................... 65/134.5 |
| SU | 337351 | * | 6/1972 | ....................... 65/356 |

OTHER PUBLICATIONS

Lewis, Richard, J. Hawley's Condensed Chemical Dictionary, copyright 1993, pp. 720–721, 800.*
Science and Technology, Glass 13, "Metals in Glassmaking", edited by R. Kirsch, 1993.

* cited by examiner

Primary Examiner—Michael Colaianni
(74) Attorney, Agent, or Firm—Jacobson Holman, PLLC

(57) ABSTRACT

In a glass melter, a precious metal insert is used to protect a gas bubbler from corrosion at the orifice of the bubbler through which gas is injected into the melt. The use of a precious refractory metal insert at the bubbler orifice prevents the attack of molten glass on the bubbler. The precious metal is chosen from the refractory group of metals and the platinum group of metals. Preferably the precious metal from the platinum group is platinum or one of its alloys or one of ruthenium, rhodium, palladium, osmium and iridium. The precious metal from the refractory group is preferably chromium.

40 Claims, 4 Drawing Sheets

AIR BUBBLER TO INCREASE GLASS PRODUCTION RATE

FIELD OF THE INVENTION

The present invention relates to an improved gas bubbler system for a glass melt tank including hazardous substances, and preferably radioactive substances.

BACKGROUND OF THE INVENTION

U.S. Pat. Nos. 5,188,649 and 5,340,372 to Macedo et al., which are hereby incorporated by reference in their entirety, teach the use of air bubbling by bubblers to increase the production rate of a glass melter. A gas bubbler is a device that delivers gas under the melt surface of a pool of glass in a glass melter. The gas rises to the melt surface in the melt pool. In this process the gas causes a forced convection current in the melt pool. At the orifice, through which the gas leaves the bubbler, the reaction between the gas, the molten glass, and the metal of the bubbler is maximized.

In the '649 and '372 patents, there is at least one horizontal, perforated INCONEL gas bubbler pipe, which is used to produce a curtain of gas bubbles between the electrodes in order to increase the specific electrical resistance of the melt. The gas bubbles also produce glass currents in the melt which distribute the feed materials on the melt surface, while delivering heat simultaneously from below, in order to achieve fast melting at relatively low temperatures.

However, the perforated pipes cannot be cooled sufficient to prevent corrosion, even by the oxygenated gas which flows therethrough. Therefore, the pipes are subjected to the aggressive effect of the glass and the oxygen at high temperatures, which results in a drastic reduction in the lifetime of the pipes, especially when the amount of oxygen is high. Furthermore, as a result of the relatively high location of the perforated pipes in the melter, the lower part of the melt, in which metallic components collect, is not sufficiently included in the circulation and oxidation of the melt, and contains elutable components.

For metals used in the gas bubbler such as INCONEL or other alloys of nickel and chromium, not only is there an attack similar to the attack at the melt line that tends to corrode metal faster than either above or below the melt line, but also there is an accelerated attack due to the fast moving liquid and gas phases. For INCONEL 690, the most commonly used metal for this type of furnace, the aperture of the orifice corrodes to an unacceptable level within two to four months.

In other patents which disclose the use of gas bubblers, the bubblers penetrate the bottom of the melter box (casing) which encase the waste glass melter. The bubblers are made of tubes of molybdenum disilicide. Due to the lack of redox control, a metal conducting phase can develop at the bottom of the melter that leads to melter failure at the bottom casing penetrations.

A second failure mechanism of the state of the art bubblers is that they develop clogging of the bubbler aperture. If a single air tube delivers air to many orifices, some will clog while others will excessively enlarge. Thus the bubbling will be uneven, reducing the effectiveness of the stirring in the melter, and thus its throughput.

The problem with waste melters is that economics often dictate that the glass composition has a high liquidus temperature. If the bottom of the melter is colder than the liquidus temperature, crystals will precipitate. In an attempt to prevent this precipitation, a bottom electrode is used to joule-heat the bottom of the melter. Even so, during short usage, the resistivity of the melter substantially changes indicating the precipitation of a conductive phase to the melter bottom.

SUMMARY OF THE INVENTION

In a first embodiment of the invention, it is desired to stir the contents of a glass melter and increase its output by use of a gas bubbler. A refractory metal insert is used to protect the bubbler from corrosion at the orifice of the bubbler through which gas is injected into the melt.

The use of a precious refractory metal insert at the bubbler orifice prevents the attack of molten glass on the bubbler. Even through precious metals may be much more expensive than INCONEL, the failure points of a bubbler are avoided by the use of a small amount of expensive metal, saving many times its value by reducing downtime of a very expensive operation.

The metal for insert is chosen from the base or platinum group metals. Preferably the precious metal from the platinum group is platinum or one of its alloys or one of ruthenium, rhodium, palladium, osmium and iridium. The base refractory metal is preferably chromium.

Another embodiment of the invention protects the orifices from clogging due to oxidation by preventing scales from being driven to the orifices by the gas supply. Clogging is avoided by internally coating or lining the high temperature region of INCONEL pipes to prevent oxidation. The lining can be a ceramic inner tube or a precious metal inner tube. Preferably the precious metal tube is made from platinum and its alloys.

Another embodiment of the invention includes the use of an AC powered, joule heated melter with at least three electrodes, one electrode in each side and one electrode in the bottom. The electrode preferably is made of a high chromium mixed alloy such as INCONEL.

The bottom electrode will have one or more orifices to bubble gas. The gas is preferably air, and most preferably an inert gas such as $N_2$ or Ar. Preferably the orifices are protected by a precious metal insert. Also, preferably each orifice or group of orifices have a separate gas supply. Also, preferably each air passage is protected by a ceramic or precious metal liner.

A contributive failure mode occurs when multiple holes are tied to the same gas supply. Small variations in the pressure drop from hole to hole may induce the melt to enter the bubbling assembly and blocks some of the holes, making it much less useful as a glass melt stirrer. By the present invention, each hole is individually supplied with air from a level comparable to the melt level, preferably above the melt level, most preferably with individually controlled pressure.

The gas for the bottom electrode bubbling system is brought into the tank from the side of the tank. Alternatively, the electrode bubbling system extends from above the melt line behind the brick inner wall. Under either scenario, there is no tank bottom penetration in that, in the environment of use, namely hazardous materials including waste, and preferably radioactive waste, penetration of the bottom wall of the tank would be potentially dangerous.

Another failure mechanism of a hazardous waste, preferably radioactive waste glass tank, is associated with the support tubes which directly penetrate the melt pool from above. The vertical support tubes tend to fail close to the melt line.

There are normally two types of support tubes; one of the tubes acts as the air supply while the other acts as a thermal well. Both tubes tend to break or fail with equal frequency, indicating that the detrimental effect at the melt line is due to contact of the metal tubes with the molten glass agitated with bubbles and the plenum air above the melt line.

The protection of the support tubes can be achieved by adding a tube or protective sleeve to the outside of the support tubes at the melt line. This additional tube can be INCONEL (chromium-nickel alloy) or precious metal, preferably concentric tubes of metal and ceramic.

A preferred protection method is to bring the gas delivery tubes behind the ceramic inner wall of the melter. The tubes come through the side and out near the bottom of the melter or come through the side wall and up the ceramic assembly leaving the melter bottom at a higher level, preferably above the melt line.

The most vulnerable location to corrosive effects in a glass melt tank is the region where the gas (air) is first in contact with the melt. Referred to as the "inverted melt line", the word "inverted" is used to designate that the air/gas phase is below this melt line, while the molten phase is above this melt line. The present invention teaches the use of precious metal inserts to protect the metal of a gas bubbler line at the inverted melt line.

Accordingly, it is an object of the present invention to increase the lifetime of a bubbler assembly, preferably to be the same as that of the melter.

It is another object of the present invention to reduce the clogging of the orifices of the bubbler, as well as to reduce uneven flow of gas.

It is still yet another object of the present invention to have a well-stirred and hot furnace bottom that discourages the precipitation of a conductive phase.

These and other objects of the invention, as well as many of the intended advantages thereof, will become more readily apparent when reference is made to the following description taken in conjunction with the accompanying drawings.

DETAILED DESCRIPTION OF THE PREFERRED EMBODIMENTS

Figure 1:
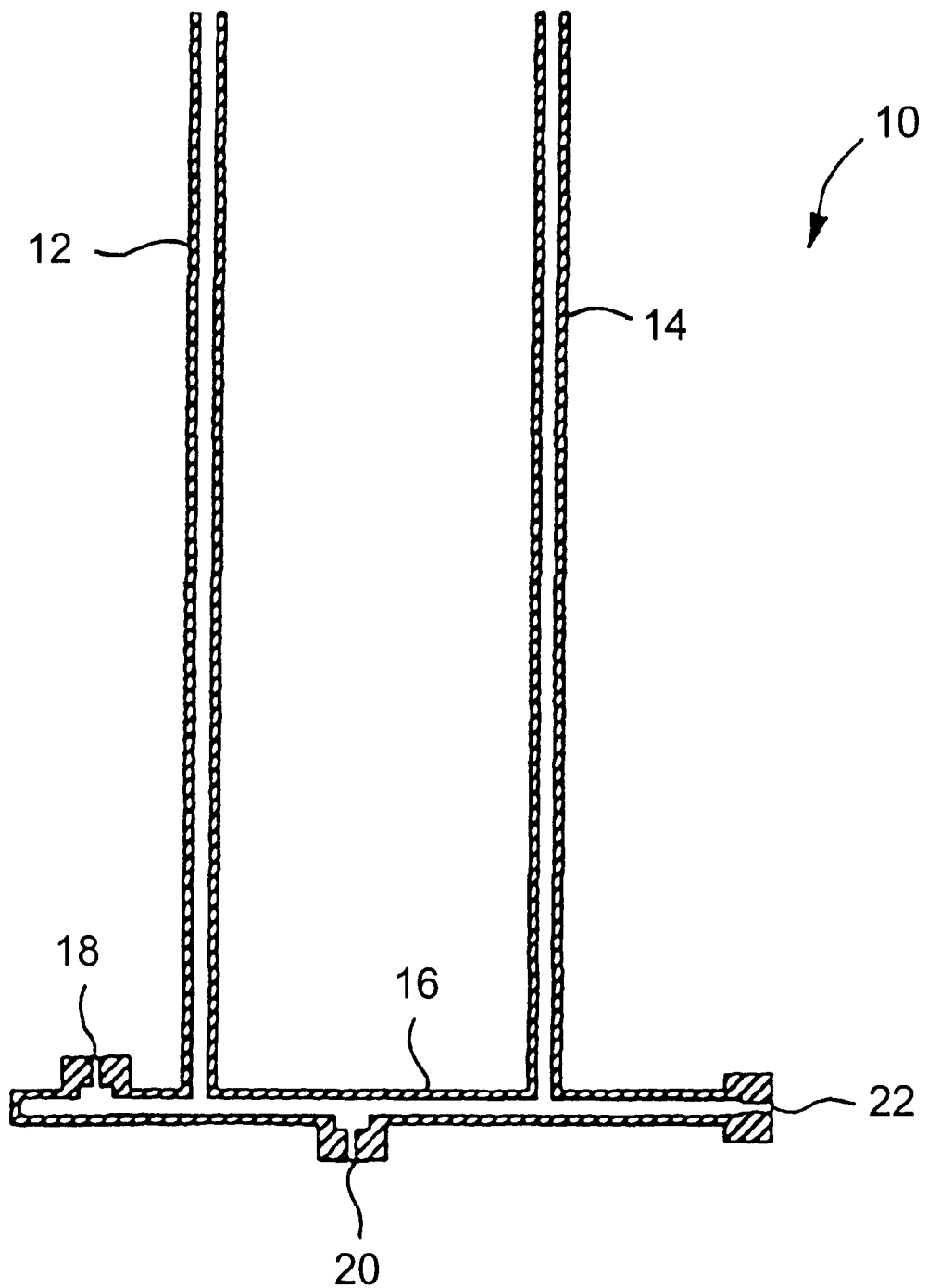
FIG. 1 schematically illustrates a gas bubbler system having differently directed orifices.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

FIG. 1 shows a bubbler assembly 10. Vertical supports 12, 14 extend from horizontal manifold tube 16. Support 12 and/or support 14 deliver gas to manifold tube 16. Manifold tube 16 supports and delivers gas to one or more orifices 18, 20, 22. Orifices 18, 20, 22 are injection points for gas to cause bubbles in the melt.

The orifices can point in different directions for example: orifice 18 points up; orifice 20 points down; and orifice 22 points sideways. The common metal used for the manifold tube 16 is INCONEL 690.

In one example of the invention, four gas bubblers include supply pipes 24, 26, 28, 30 made of INCONEL. The supply pipes 24, 26, 28, 30 are installed in a glass melter 32, as shown schematically in FIG. 2. The supply pipes extend from above a melt line 31 into a glass melt 56. Each respective supply pipe includes a gas outlet orifice 34, 36, 38 and 40.

In the supply pipe 24, the orifice 34 is a drilled hole formed in the INCONEL 690 block 42 located at the terminal end of the supply pipe. The other three supply pipes include a metal insert in the INCONEL block located at the terminal end of the respective supply pipes 26, 28, 30.

In the three supply pipes 26, 28, 30, a hole was drilled in inserts 44, 46 and 48 fixed in INCONEL blocks 50, 52 and 54 at the terminal ends of the supply pipes 26, 28, 30, respectively. Insert 44 is made of sintered chrome. Insert 46 is made of a 95% Pt-5% Au alloy. Insert 48 is made of platinum. The glass melt 56 in the melter 32 is a borosilicate glass melted from chemicals and asbestos containing wastes. Alternatively, radioactive waste may be included in the glass melt 56.

The melt temperature is held between 1000° C. and 1100° C. during a test of the bubblers. Each bubbler was provided with an independent filtered air supply, not shown, leading to supply pipes 24, 26, 28 and 30. The airflow in each bubbler was adjusted to give approximately 10 scfh airflow. The supply pressure was measured for each bubbler, which indicated whether the orifice was becoming blocked. All of the bubblers showed signs of partial blockage over the course of the test. All of the bubblers still exhibited airflow at the end of the test.

The bubblers were operated for 8 weeks after which time they were removed in order to determine the extent of corrosion suffered by each orifice. Examination of the orifices at the end of the test revealed the extent to which they had corroded.

The INCONEL 690 block 42 at orifice 34 had corroded the most with its orifice diameter increased by about 40% measured about 2 mm down from the top of the orifice 34. The orifice 36 in the chrome insert 44 increased about 15% in diameter measured at the same 2 mm depth. The orifice 38 in the Pt—Au alloy insert 46 and the orifice 40 in the Pt insert 48 did not increase their diameters.

The Pt—Au alloy insert 46 showed some surface roughening of the orifice wall and some growth of altered metal into the orifice. In addition, it was found that scale from the INCONEL supply pipes 24, 26, 28 and 30 had caused a substantial part of the observed blockage in the bubbler orifices.

Figure 3:
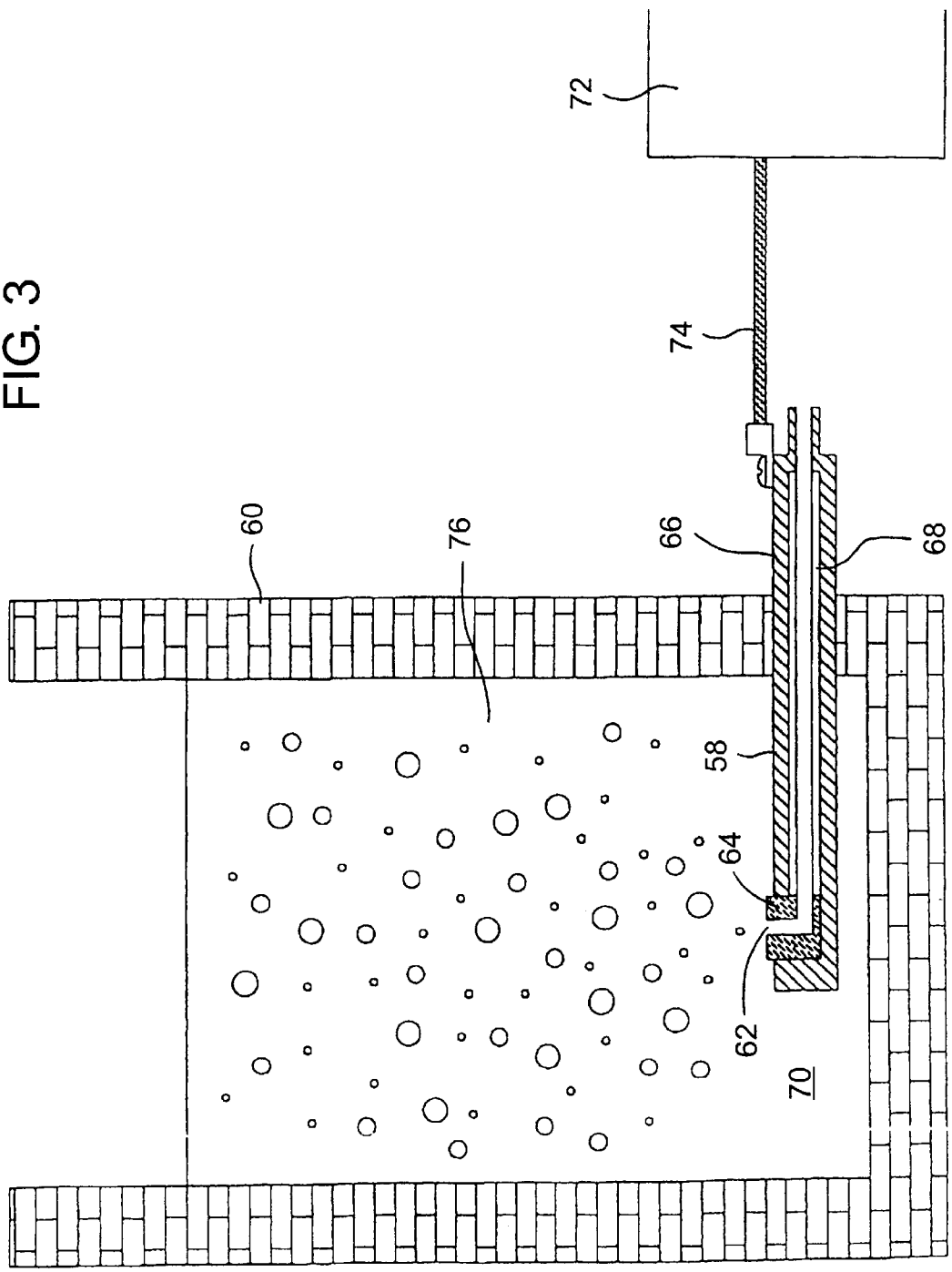
FIG. 3 schematically illustrates a glass bubbler system extending through a sidewall of a glass melter, above a bottom of the glass melter, and including a ceramic liner for the gas supply pipe, terminating in a precious metal insert at an orifice.

In a second example, a bubbler 58 is installed in a melter 60, as shown in FIG. 3. The orifice 62 was a hole drilled in an insert 64, fixed in an INCONEL 690 gas supply pipe 66.

The interior of the pipe 66 is lined with a mullite tube 68 to prevent scale from the INCONEL pipe 66 from entering the air supply and from being delivered to the orifice 62 to cause blockage. The bubbler 58 is installed at or above the bottom 70 of the melter 60 and is connected to an AC power supply 72 by a cable 74 in order that the bubbler pipe may act as an electrode to aid in heating the waste glass 76, at the bottom 70 of the melt pool.

Figure 2:
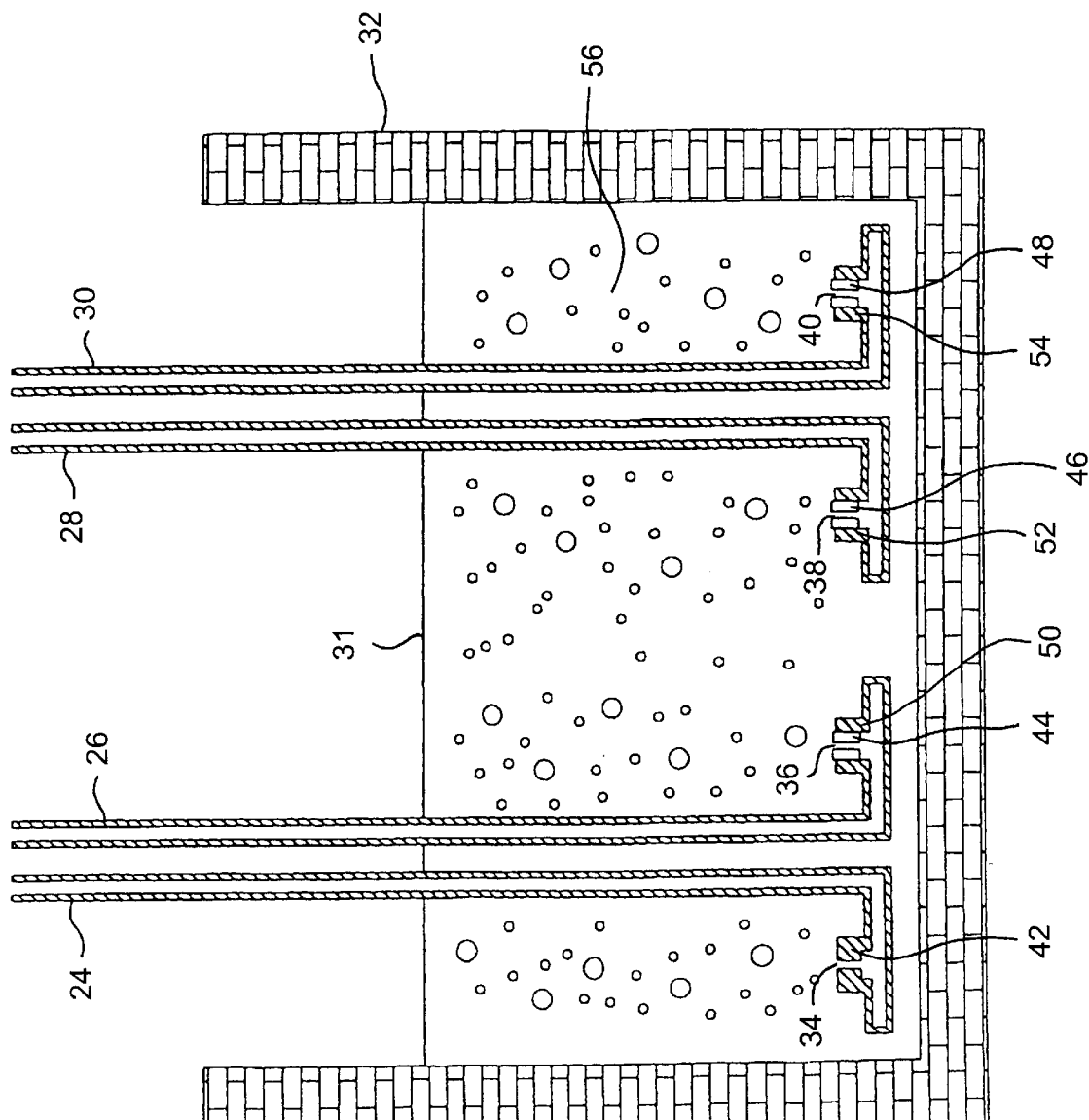
FIG. 2 schematically illustrates a glass melter having four gas supply pipes extending from above a glass melt and terminating in the glass melt in an orifice formed from four different materials.
Figure 4:
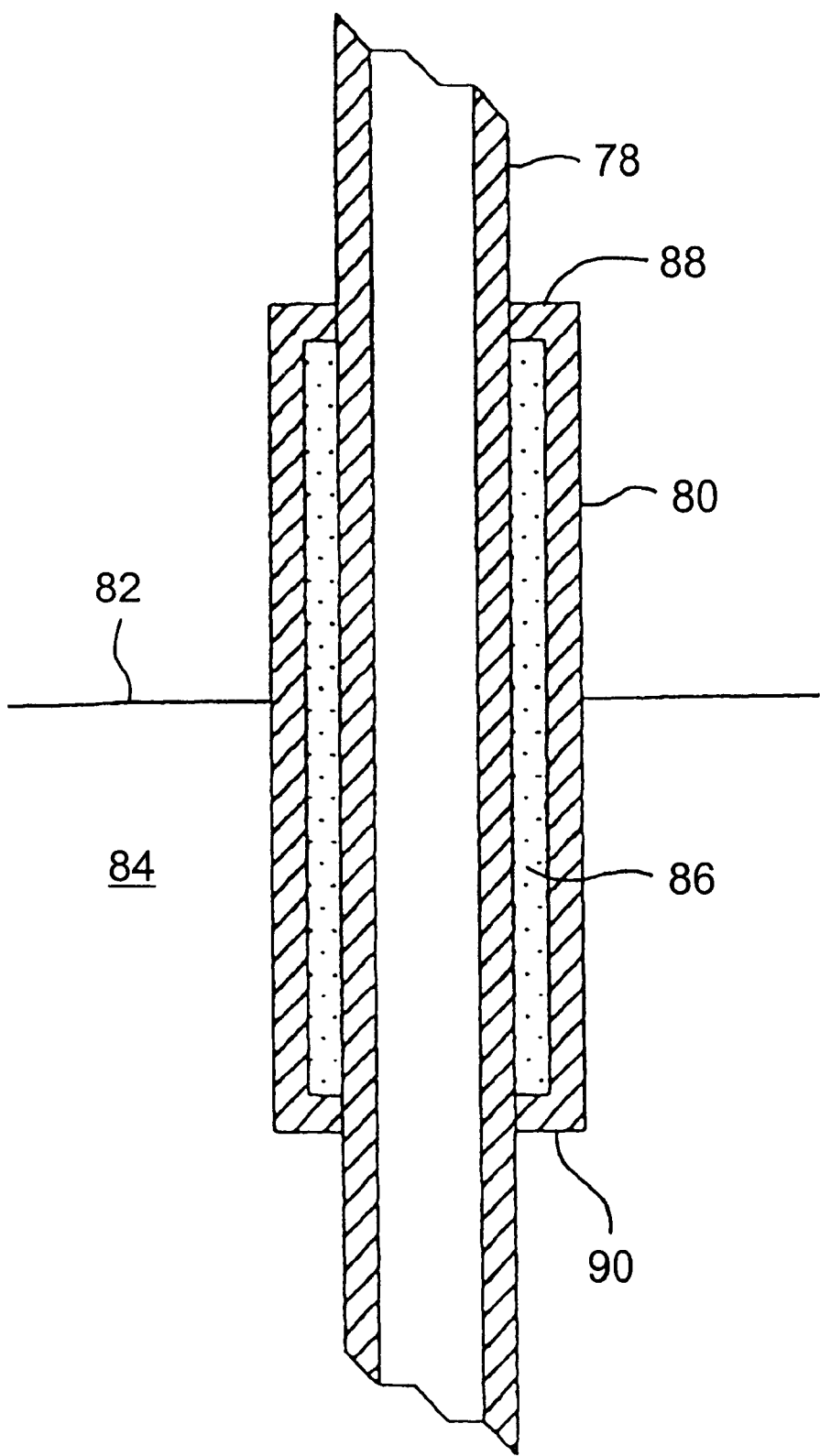
FIG. 4 schematically illustrates a protective sleeve surrounding a supply/support pipe at a glass melt level.

In a third example, a bubbler is installed in a melter as shown in FIG. 2. As is shown in a cross sectional view of part of the air supply/support pipe (FIG. 4), the air supply/support pipe 78 is modified by a reinforcing sleeve 80 which extends above and below the normal level 82 of the glass melt 84.

The reinforcing sleeve 80 consists of an outer INCONEL 690 pipe section of sufficient inside diameter to create an annular space 86 between an interior of the sleeve 80 and the supply/support pipe 78. The top 88 and bottom 90 of the reinforcing sleeve 80 are welded to the supply/support pipe 78. The annular space 86 is filled with magnesium oxide powder or mullite.

The sleeve protects the supply/support pipe from the particularly corrosive environment located at the melt line of the tank. The added protection at the melt line considerably extends the life of the supply/support pipe to approximately the life of the melter.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A joule-heated melting furnace for the inertization of hazardous substances by vitrification with glass forming chemicals, said furnace comprising:
   a tank having a bottom wall and side walls,
   a gas bubbler introduced into said tank above said bottom wall for supplying a gas into said tank and stirring the contents of said tank, said gas bubbler being an electrode connected to a power supply,
   a gas outlet of said gas bubbler, and
   a precious metal insert of said gas bubbler, said gas outlet extending through said precious metal insert for release of the gas into said tank.

2. A joule-heated melting furnace for the inertization of hazardous substances as claimed in claim 1, wherein said precious metal insert is made of platinum.

3. A joule-heated melting furnace for the inertization of hazardous substances as claimed in claim 1, wherein said precious metal insert is made of a platinum alloy.

4. A joule-heated melting furnace for the inertization of hazardous substances as claimed in claim 1, wherein said gas bubbler includes a gas supply pipe, said gas supply pipe extending from above a level of a glass melt into the glass melt.

5. A joule-heated melting furnace for the inertization of hazardous substances as claimed in claim 1, wherein said gas bubbler includes a gas supply pipe extending through a side wall of the tank.

6. A joule-heated melting furnace for the inertization of hazardous substances as claimed in claim 5, wherein said gas supply pipe is lined with an internal protective liner.

7. A joule-heated melting furnace for the inertization of hazardous substances as claimed in claim 6, wherein said protective liner is mullite.

8. A joule-heated melting furnace for the inertization of hazardous substances as claimed in claim 4, wherein said gas supply pipe includes a protective sleeve at the level of the glass melt.

9. A joule-heated melting furnace for the inertization of hazardous substances as claimed in claim 8, wherein an annular gap is formed between said protective sleeve and said gas supply pipe.

10. A joule-heated melting furnace for the inertization of hazardous substances as claimed in claim 9, wherein said annular gap includes one of magnesium oxide powder and mullite.

11. A joule-heated melting furnace for the inertization of hazardous substances by vitrification with glass forming chemicals, said furnace comprising:
    a tank having a bottom wall and side walls, and
    a gas bubbler introduced into said tank above said bottom wall for supplying a gas into said tank and stirring the contents of said tank, said gas bubbler being connected to a power supply for use of the gas bubbler as an electrode in the tank.

12. A joule-heated melting furnace for the inertization of hazardous substances as claimed in claim 11, wherein said gas bubbler extends through a side wall of the tank.

13. A joule-heated melting furnace for the inertization of hazardous substances as claimed in claim 12, wherein said gas bubbler is lined with an internal protective liner.

14. A joule-heated melting furnace for the inertization of hazardous substances as claimed in claim 13, wherein said protective liner is mullite.

15. A joule-heated melting furnace for the inertization of hazardous substances as claimed in claim 11, wherein said gas bubbler includes at least one bubbler hole.

16. A joule-heated melting furnace for the inertization of hazardous substances as claimed in claim 15, wherein each bubbler hole is connected to a separately controlled gas supply.

17. A joule-heated melting furnace for the inertization of hazardous substances by vitrification with glass forming chemicals, said furnace comprising:
    a tank having a bottom wall and side walls,
    a gas bubbler introduced into said tank above said bottom wall for supplying a gas into said tank and stirring the contents of said tank, said gas bubbler being an electrode connected to a power supply, and
    a gas supply pipe extending through a side wall of the tank and connected to said gas bubbler, said gas supply pipe being lined with an internal protective liner for preventing formation of scales in said gas supply pipe.

18. A joule-heated melting furnace for the inertization of hazardous substances as claimed in claim 17, wherein said protective liner is mullite.

19. A joule-heated melting furnace for the inertization of radioactive substances by vitrification with glass forming chemicals, said furnace comprising:
    a tank having a bottom wall and side walls suitable for containing radioactive substances,
    a gas bubbler introduced into said tank above said bottom wall for supplying a gas into said tank and stirring the contents of said tank,
    said gas bubbler including a gas supply pipe, said gas supply pipe extending from above a level of a glass melt into the glass melt,
    a protective sleeve surrounding said gas supply pipe at the level of the glass melt with the protective sleeve being fixed to the gas supply pipe, and
    an annular gap formed between said protective sleeve and said gas supply pipe.

20. A joule-heated melting furnace for the inertization of radioactive substances as claimed in claim 19, wherein said annular gap includes magnesium oxide powder.

21. A process to stir a glass melt containing hazardous substances in a melting furnace, said process comprising:

inserting a gas bubbler into the glass melt above a bottom wall of a tank containing the glass melt, passing a gas into the gas bubbler, and introducing the gas into the glass melt through an orifice formed in a precious metal insert of the gas bubbler, passing an electric current into the glass melt through the gas bubbler.

22. A process to stir a glass melt containing hazardous substances as claimed in claim 21, wherein said precious metal insert is made of platinum.

23. A process to stir a glass melt containing hazardous substances as claimed in claim 21, wherein said precious metal insert is made of a platinum alloy.

24. A process to stir a glass melt containing hazardous substances as claimed in claim 21, wherein said gas bubbler is inserted into the glass melt from above the glass melt.

25. A process to stir a glass melt containing hazardous substances as claimed in claim 21, wherein said gas bubbler is inserted into the glass melt through a side wall of the tank containing the glass melt.

26. A process to stir a glass melt containing hazardous substances as claimed in claim 21, wherein said gas bubbler is inserted into said glass melt until a protective sleeve of said glass bubbler is located at an upper level of said glass melt.

27. A process to stir a glass melt containing hazardous substances as claimed in claim 21, wherein a protective liner is inserted into said gas bubbler to prevent production of scaling in said gas bubbler from being introduced to said orifice.

28. A joule-heated melting furnace for the inertization of radioactive substances by vitrification with glass forming chemicals, said furnace comprising:

a tank having a bottom wall and side walls suitable for containing radioactive substances, a gas bubbler introduced into said tank above said bottom wall for supplying a gas into said tank and stirring the contents of said tank, a gas outlet of said gas bubbler, a precious metal insert of said gas bubbler, said gas outlet extending through said precious metal insert for release of the gas into said tank, said gas bubbler including a gas supply pipe, said gas supply pipe extending from above a level of a glass melt into the glass melt, said gas supply pipe including a protective sleeve at the level of the glass melt with the protective sleeve being fixed to the gas supply pipe, and an annular gap formed between said protective sleeve and said gas supply pipe.

29. A joule-heated melting furnace for the inertization of radioactive substances as claimed in claim 28, wherein said annular gap includes one of magnesium oxide powder and mullite.

30. A joule-heated melting furnace for the inertization of radioactive substances by vitrification with glass forming chemicals, said furnace comprising:

a tank having a bottom wall and side walls suitable for containing radioactive substances, a gas bubbler introduced into said tank above said bottom wall for supplying a gas into said tank and stirring the contents of said tank, a gas outlet of said gas bubbler, a metal insert of said gas bubbler made of chromium, said gas outlet extending through said metal insert for release of the gas into said tank, said gas bubbler including a gas supply pipe, said gas supply pipe extending from above a level of a glass melt into the glass melt, said gas supply pipe including a protective sleeve at the level of the glass melt with the protective sleeve being fixed to the gas supply pipe, and an annular gap formed between said protective sleeve and said gas supply pipe.

31. A joule-heated melting furnace for the inertization of radioactive substances as claimed in claim 30, wherein said annular gap includes one of magnesium oxide powder and mullite.

32. A joule-heated melting furnace for the inertization of radioactive substances by vitrification with glass forming chemicals, said furnace comprising:

a tank having a bottom wall and side walls suitable for containing radioactive substances, a gas bubbler introduced into said tank above said bottom wall for supplying a gas into said tank and stirring the contents of said tank, a gas outlet of said gas bubbler, said gas bubbler including a gas supply pipe, said gas supply pipe extending from above a level of a glass melt into the glass melt, said gas supply pipe including a protective sleeve at the level of the glass melt with the protective sleeve being fixed to the gas supply pipe, and an annular gap formed between said protective sleeve and said gas supply pipe.

33. A joule-heated melting furnace for the inertization of radioactive substances as claimed in claim 32, wherein said annular gap includes one of magnesium oxide powder and mullite.

34. A joule-heated melting furnace for the inertization of hazardous substances by vitrification with glass forming chemicals, said furnace comprising:

a tank having a bottom wall and side walls, and a gas bubbler introduced into said tank for supplying a gas into said tank and stirring the contents of said tank, said gas bubbler being connected to a power supply for use of the gas bubbler as an electrode in the tank.

35. A process to stir a glass melt containing hazardous substances in a melting furnace, said process comprising:

inserting a gas bubbler into the glass melt above a bottom wall of a tank containing the glass melt, passing a gas into the gas bubbler, introducing the gas into the glass melt through an orifice formed in a metal insert of the gas bubbler made of chromium, and passing an electric current into the glass melt through the glass bubbler.

36. A joule-heated melting furnace for the inertization of radioactive substances by vitrification with glass forming chemicals, said furnace comprising:

a tank having a bottom wall and side walls suitable for containing radioactive substances, a gas bubbler introduced into said tank above said bottom wall for supplying a gas into said tank and stirring the contents of said tank, a gas outlet of said gas bubbler, and said gas bubbler including a gas supply pipe, said gas supply pipe extending from above an upper level of a glass melt into the glass melt, said gas supply pipe including a protective sleeve surrounding said gas supply pipe at the upper level of the glass melt with the protective sleeve being fixed to the gas supply pipe so that the protective sleeve extends above and below the upper level of the glass melt, said protective sleeve including metal.

37. A joule-heated melting furnace for the inertization of radioactive substances as claimed in claim 19, wherein a ceramic material is located in the annular gap.

38. A joule-heated melting furnace for the inertization of radioactive substances as claimed in claim 37, wherein said annular gap includes one of magnesium oxide powder and mullite.

39. A joule-heated melting furnace for the inertization of radioactive substances as claimed in claim 36, wherein said gas supply pipe is enclosed by said protective sleeve.

40. A joule-heated melting furnace for the inertization of radioactive substances as claimed in claim 36, wherein said metal is an alloy of chromium and nickel.

* * * * *